(12) United States Patent
Coudron

(10) Patent No.: US 9,477,762 B2
(45) Date of Patent: *Oct. 25, 2016

(54) SEARCH CONTROLS USING SLIDERS AND LIGHTBOXES

(71) Applicant: Funded Ventures Inc., Austin, TX (US)

(72) Inventor: Jonathan Coudron, Austin, TX (US)

(73) Assignee: Funded Ventures Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/729,493

(22) Filed: Jun. 3, 2015

(65) Prior Publication Data

US 2015/0261814 A1 Sep. 17, 2015

Related U.S. Application Data

(63) Continuation of application No. 14/566,262, filed on Dec. 10, 2014, which is a continuation of application No. 14/151,505, filed on Jan. 9, 2014, now Pat. No. 8,943,036.

(51) Int. Cl.
*G06F 17/30* (2006.01)
*G06F 3/0485* (2013.01)
*G06F 3/0484* (2013.01)
*G06F 3/0481* (2013.01)

(52) U.S. Cl.
CPC ........ *G06F 17/30864* (2013.01); *G06F 3/0481* (2013.01); *G06F 3/0485* (2013.01); *G06F 3/04847* (2013.01); *G06F 17/3064* (2013.01); *G06F 17/3097* (2013.01); *G06F 17/30392* (2013.01); *G06F 17/30905* (2013.01)

(58) Field of Classification Search
None
See application file for complete search history.

(56) References Cited

U.S. PATENT DOCUMENTS

| | | |
|---|---|---|
| 7,131,068 B2 | 10/2006 | O'neal et al. |
| 7,134,079 B2 | 11/2006 | Brown et al. |
| 7,454,708 B2 | 11/2008 | O'Neal et al. |
| 7,873,622 B1 | 1/2011 | Karls et al. |
| 8,176,440 B2 | 5/2012 | Stading |
| 8,332,381 B1 | 12/2012 | Coudron et al. |
| 8,370,329 B2 | 2/2013 | Gutt et al. |
| 8,583,670 B2 | 11/2013 | Cameron et al. |

(Continued)

OTHER PUBLICATIONS

"U.S. Appl. No. 14/151,476, Examiner Interview Summary mailed May 30, 2014", 3 pgs.

(Continued)

*Primary Examiner* — Belix M Ortiz Ditren
(74) *Attorney, Agent, or Firm* — Schwegman Lundberg & Woessner, P.A.

(57) ABSTRACT

Code is injected into a web page loaded by an Internet browsing application. A search control to accept Internet search input is presented within an Internet browsing application. The search control visually covers at least a portion of a content display area of the Internet browsing application. A slider search control may be presented by automatically sliding the slider search control into the content display area. The presentation of a lightbox search control may include shading, darkening, dimming, blurring, or opaquing the content display area outside of the lightbox search control. The presentation of the search control may occur in response to a period of user inactivity, an amount of page scrolling, or a percentage of page scrolling. The search control receives input corresponding to a search query, a tracking code is combined with the received input, and the combination is communicated to a search engine.

15 Claims, 12 Drawing Sheets

(56) References Cited

U.S. PATENT DOCUMENTS

| | | | |
|---|---|---|---|
| 8,612,414 B2* | 12/2013 | Lee et al. | 707/706 |
| 8,874,543 B1 | 10/2014 | Coudron | |
| 8,943,036 B1 | 1/2015 | Coudron | |
| 2002/0056083 A1 | 5/2002 | Istvan | |
| 2006/0130106 A1 | 6/2006 | Iwata et al. | |
| 2006/0282795 A1* | 12/2006 | Clark et al. | 715/840 |
| 2007/0043712 A1* | 2/2007 | Ramberg | 707/3 |
| 2007/0061410 A1 | 3/2007 | Alperin | |
| 2008/0005686 A1 | 1/2008 | Singh | |
| 2009/0327947 A1 | 12/2009 | Schreiner et al. | |
| 2010/0100839 A1* | 4/2010 | Tseng et al. | 715/780 |
| 2010/0162164 A1 | 6/2010 | Kwon et al. | |
| 2010/0306237 A1 | 12/2010 | Chandley et al. | |
| 2012/0060114 A1 | 3/2012 | Chung et al. | |
| 2012/0176543 A1* | 7/2012 | Jeong | 348/563 |
| 2013/0198640 A1 | 8/2013 | Brugler et al. | |
| 2013/0198660 A1 | 8/2013 | Brugler et al. | |
| 2015/0261771 A1 | 9/2015 | Coudron | |
| 2015/0269260 A1 | 9/2015 | Coudron | |

OTHER PUBLICATIONS

"U.S. Appl. No. 14/151,476, Non Final Office Action mailed Mar. 11, 2014", 14 pgs.

"U.S. Appl. No. 14/151,476, Notice of Allowance mailed Jun. 25, 2014", 9 pgs.

"U.S. Appl. No. 14/151,476, Response filed May 15, 2014 to Non Final Office Action mailed Mar. 11, 2014", 18 pgs.

"U.S. Appl. No. 14/151,505, Non Final Office Action mailed Mar. 28, 2014", 12 pgs.

"U.S. Appl. No. 14/151,505, Notice of Allowance mailed Sep. 10, 2014", 8 pgs.

"U.S. Appl. No. 14/151,505, Response filed Jun. 27, 2014 to Non Final Office Action mailed Mar. 28, 2014", 18 pgs.

"U.S. Appl. No. 14/566,262, Non Final Office Action mailed Jun. 19, 2015", 7 pgs.

"U.S. Appl. No. 14/729,449, Non Final Office Action mailed Jul. 17, 2015", 7 pgs.

"U.S. Appl. No. 14/729,449, Response filed Oct. 19, 2015 to Non-Final Office Action mailed Jul. 17, 2015", 21 pgs.

\* cited by examiner

SEARCH CONTROLS USING SLIDERS AND LIGHTBOXES

CLAIM OF PRIORITY

This patent application is a Continuation Application of, and claims the benefit of priority under 37 C.F.R. §1.53(b) to, U.S. patent application Ser. No. 14/566,262, entitled "SEARCH CONTROLS USING SLIDERS AND LIGHTBOXES," filed on Dec. 10, 2014, which is a Continuation Application of, and which claims the benefit of priority under 37 C.F.R. §1.53(b) to, U.S. patent application Ser. No. 14/151,505, also entitled "SEARCH CONTROLS USING SLIDERS AND LIGHTBOXES," filed on Jan. 9, 2014, now U.S. Pat. No. 8,943,036, issued on Jan. 27, 2015, each of which is hereby incorporated by reference herein in their entireties.

BACKGROUND

Major search engines offer incentives to publishers of Internet browsers and Internet browser add-ons who direct user Internet searches to the search engine. Most search add-ons require the user to select the search input field of the add-on before accepting search input; in other words, most search add-ons are reactive in that they wait for a user to indicate that the user is interested in submitting a search query.

BRIEF DESCRIPTION OF THE DRAWINGS

In the drawings, which are not necessarily drawn to scale, like numerals may describe similar components in different views. Like numerals having different letter suffixes may represent different instances of similar components. Various embodiments are illustrated by way of example, and not limitation, in the figures of the accompanying drawings, in which.

DETAILED DESCRIPTION

The following description and the drawings illustrate specific embodiments to enable those skilled in the art to practice them. Other embodiments may incorporate structural, logical, electrical, process, and other changes. Portions and features of various embodiments may be included in, or substituted for, those of other embodiments. Embodiments set forth in the claims encompass all available equivalents of those claims.

Currently, several web browser plugins exist that provide web users a capability to search from within a web page. However, each of these plugins has user interface limitations.

ScrollNav (available at http://codecanyon.net/item/scroll-nav-scroll-to-top-sliding-menu-search-wp/5550144) is a plugin for WordPress, designed to improve user navigation in a WordPress page using a circular button that contains various functions, one of which is a search box. The circular button appears towards the bottom of the browser window after the user begins to scroll down the web page. However, initial display of the circular button does not have the search box visible, nor does the search box have focus. Thus, a user wanting to use the search box would have to select the portion of the circular button corresponding to the search box, and then would have to select the area within the search box to begin typing. Furthermore, the ScrollNav plugin allows searching of only WordPress sites, does not "slide" into the visual area of the browser, and does not appear based on user inactivity. Also, ScrollNav does not suggest search terms based on previous search queries or upon the content of the currently displayed web page.

OrangeBox (available at http://davidpaulhamilton.net/orangebox/) is a lightweight jQuery lightbox plugin that supports content from images, Flickr, Picasa, YouTube, Vimmeo, Viddler, Flash, inline content, iFrames, and PDF's. However, OrangeBox does not suggest search terms based on previous search queries or upon the content of the currently displayed web page, nor does OrangeBox display after a period of user inactivity.

Figure 1:
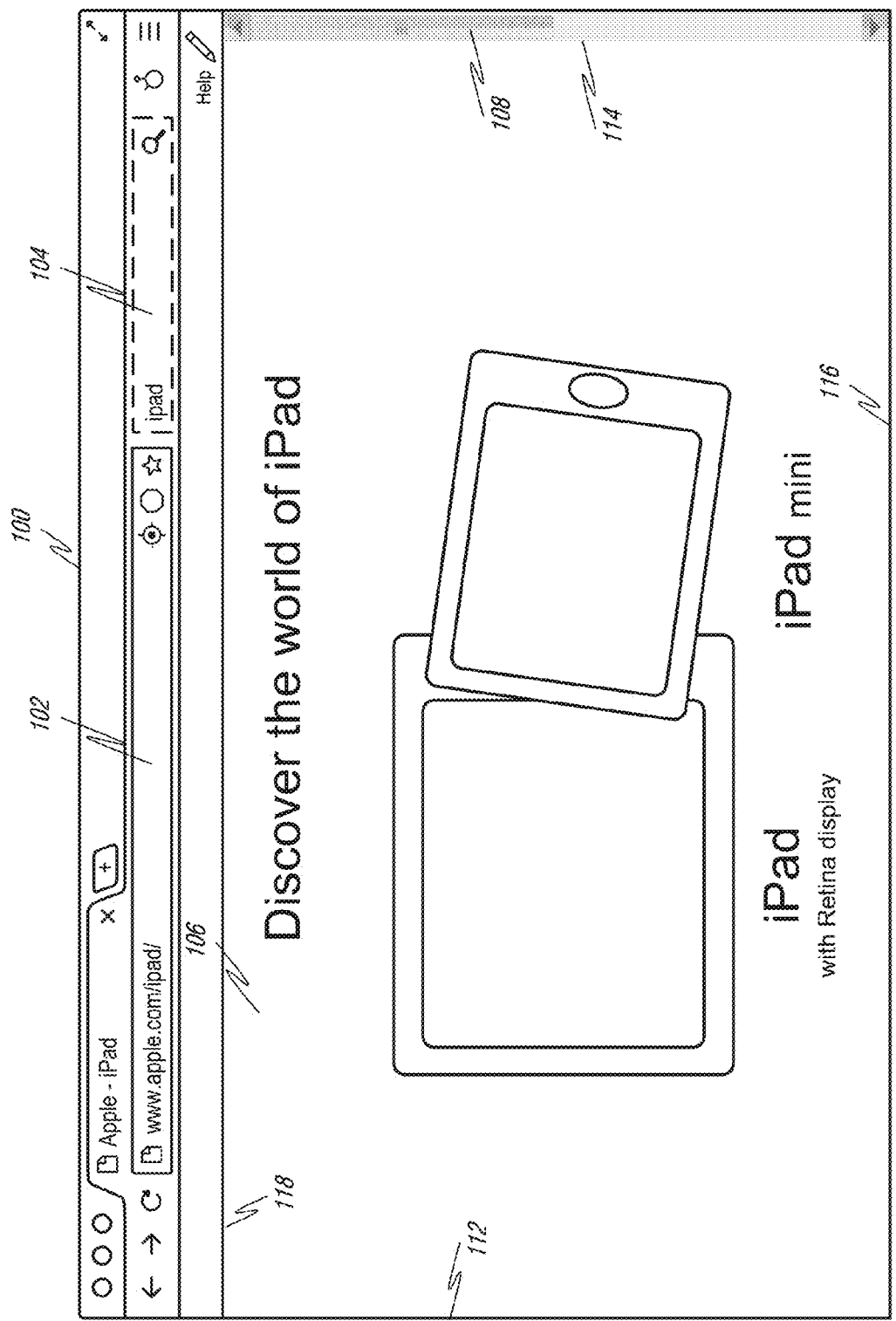
FIG. 1 is a view of an Internet browsing application, in accordance with various embodiments.

FIG. 1 is a view of an Internet browsing application 100, in accordance with various embodiments. In various embodiments, Internet browsing application 100 includes an omnibox/address bar 102, content display area 106, and a vertical scroll bar 108. In various embodiments, Internet browsing application 100 may optionally include search bar 104. The content display area 106 provides a view of content retrieved by the Internet browsing application. The content display area 106 is bounded by a left edge 112, a right edge 114, a bottom edge 116, and a top edge 118. In various embodiments, the Internet browsing application 100 may include a horizontal scroll bar in addition to or instead of vertical scroll bar 108.

In various embodiments, a user of the Internet browsing application 100 can perform Internet searches by entering search terms into the omnibox/address bar 102. In various embodiments that include search bar 104, a user of the Internet browsing application 100 may perform Internet searches by entering search terms into the search bar 104 or the omnibox/address bar 102. In various embodiments, if the content displayed in content area 106 contains a search box, a user of the Internet browsing application 100 may also perform Internet searches by entering search terms into the search box displayed in content area 106.

In the example Internet browsing application 100 of FIG. 1, the content display area 106 displays a fictional view of content from the web page located at URL www.apple.com/ipad. The content of this web page is taller than the height of content display area 106, thus vertical scroll bar 108 is enabled, allowing the user to scroll to view additional content of this web page.

Figure 2:
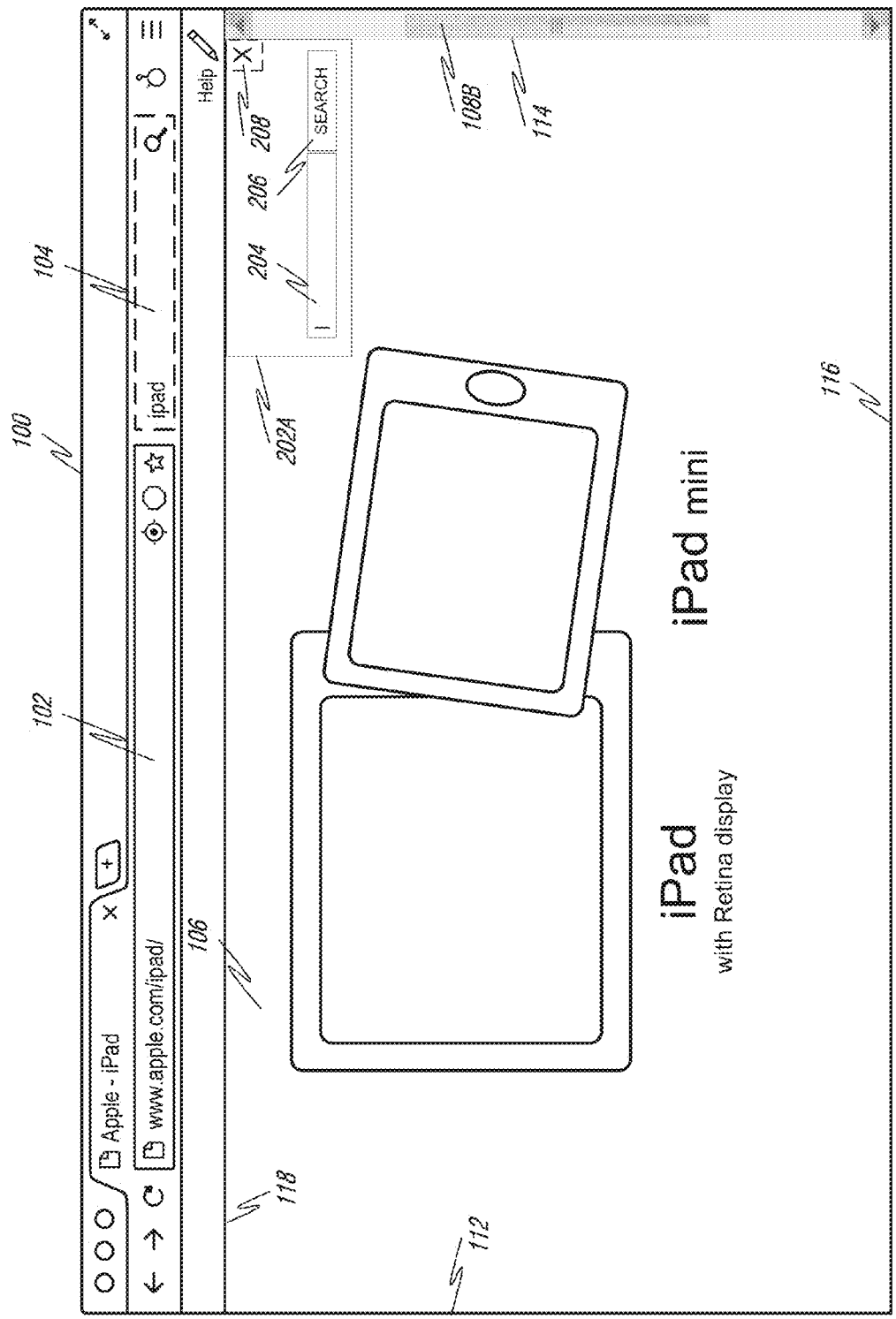
FIG. 2 is a view of an Internet browsing application with a slider search control displayed, in accordance with various embodiments.

FIG. 2 is a view of an Internet browsing application 100 with a slider search control 202A displayed, in accordance with various embodiments. In various embodiments, the slider search control 202A includes a text box 204 and a search button 206. In various embodiments, the slider search control 202A may optionally include a close button 208. In various embodiments, the slider search control 202A visually covers at least a portion of content display area 106.

In various embodiments, the slider search control 202A is presented to the user by automatically sliding the slider search control 202A into the content display area 106 from at least one of the left edge 112, the right edge 114, the bottom edge 116, and the top edge 118 of the content display area 106. In various embodiments, the slider search control 202A may be anchored to at least one of the left edge 112, the right edge 114, the bottom edge 116, and the top edge 118 of the content display area 106. In FIG. 2, the slider search control 202A is shown as anchored to right edge 114 and top edge 118 of content display area 106.

In various embodiments, the slider search control 202A is presented to the user in response to at least one of a period of user inactivity, an amount of page scrolling by the user, and a percentage of page scrolling by the user. In various embodiments, a period of user inactivity can be a predetermined amount of time, during which the user does not scroll, input, select, or otherwise interact with the web page. In various embodiments, an amount of page scrolling can include a number of lines or columns of pixels scrolled. In various embodiments, an amount of page scrolling sufficient to trigger presentation of the slider search control 202A can include scrolling to make visible in content display area 106 a particular element of the web page that previously was not visible in content display area 106. In various embodiments, an amount of page scrolling sufficient to trigger presentation of the slider search control 202A can include scrolling to make not visible in content display area 106 a particular element of the web page that was previously visible in content display area 106. In various embodiments, the percentage of page scrolling by the user sufficient to trigger presentation of the slider search control 202A can be a predetermined percentage of the entire web page or a predetermined percentage of a portion of the web page. In FIG. 2, the slider search control 202A is displayed because the user sufficiently scrolled the vertical scroll bar 108B.

In various embodiments, the slider search control 202A remains visible after being presented. In various embodiments, the slider search control 202A remains visible until the user closes the slider search control 202A, such as by selecting the close button 208 displayed in slider search control 202A. In various embodiments, the slider search control 202A remains visible until the user scrolls past a certain point in the web page. For example, the slider search control 202A may remain visible until the user scrolls the web page back to the top. In various embodiments, the slider search control 202A remains visible until the user scrolls the web page back to a point, before which the slider search control 202A was not displayed. For example, if the slider search control 202A was configured to be presented upon the user scrolling down 50% of the web page, the slider search control 202A may remain visible until the user scrolls up past 50% of the web page.

In various embodiments, the slider search control 202A may be displayed in the content display area 106 of the currently displayed tab of Internet browsing application 100. In various embodiments, the slider search control 202A may be displayed in the content display area 106 of each open tab of Internet browsing application 100.

In various embodiments, upon the slider search control 202A being presented, text box 204 may have "focus." By having "focus," the text box 204 is ready to receive textual input without the user having to select text box 204 prior to the textual input.

In various embodiments, the text box 204 can receive textual input corresponding to a search query to be communicated to a search engine. For example, the user could enter a search query, such as "Chinese takeout," into text box 204 and direct the search query to be communicated to one or more search engines by either hitting the "Enter" key or by selecting the search button 206. The search query is then combined with a tracking code and the resulting search request is communicated to one or more search engines. The results of the search request may be displayed in content display area 106 of the current tab of the Internet browsing application 100, in content display area 106 of a new tab of the Internet browsing application 100, or in content display area 106 of a new window of the Internet browsing application 100.

In various embodiments, text box 204 of slider search control 202A may be prepopulated with one or more search terms; each search term may correspond to a search term used in a previous search or to content in the content display area 106 of the Internet browsing application 100.

In various embodiments, after receiving the search query from text box 204, a tracking code is combined with the search query to form a search request. In various embodiments, the tracking code is associated with at least one of a user, the Internet browsing application 100, a session of the Internet browsing application 100, the computer upon which the Internet browsing application 100 is executing, an entity such as a company or non-profit organization, for whom search loyalty rewards will accumulate, or another process, device, person, or entity having an account. Such tracking codes, and other tracking codes, may also be associated with a provider of the slider search control 202A as disclosed herein. A tracking code associated with the provider of the slider search control 202A may be used to track one or more of searches performed, links selected, and revenue accumulated resulting from slider search control 202A usage. For example, a tracking code combined with a search query for submission to a particular search engine will be used by the search engine to credit an account as compensation for routing the search to that search engine.

In various embodiments, the search request is communicated to at least one search engine. In various embodiments, search requests are submitted only to those search engines with which the software publisher of the slider search control 202A has an agreement.

In various embodiments, the text box 204 suggests search terms using "autocomplete" or "word completion".

Figure 3:
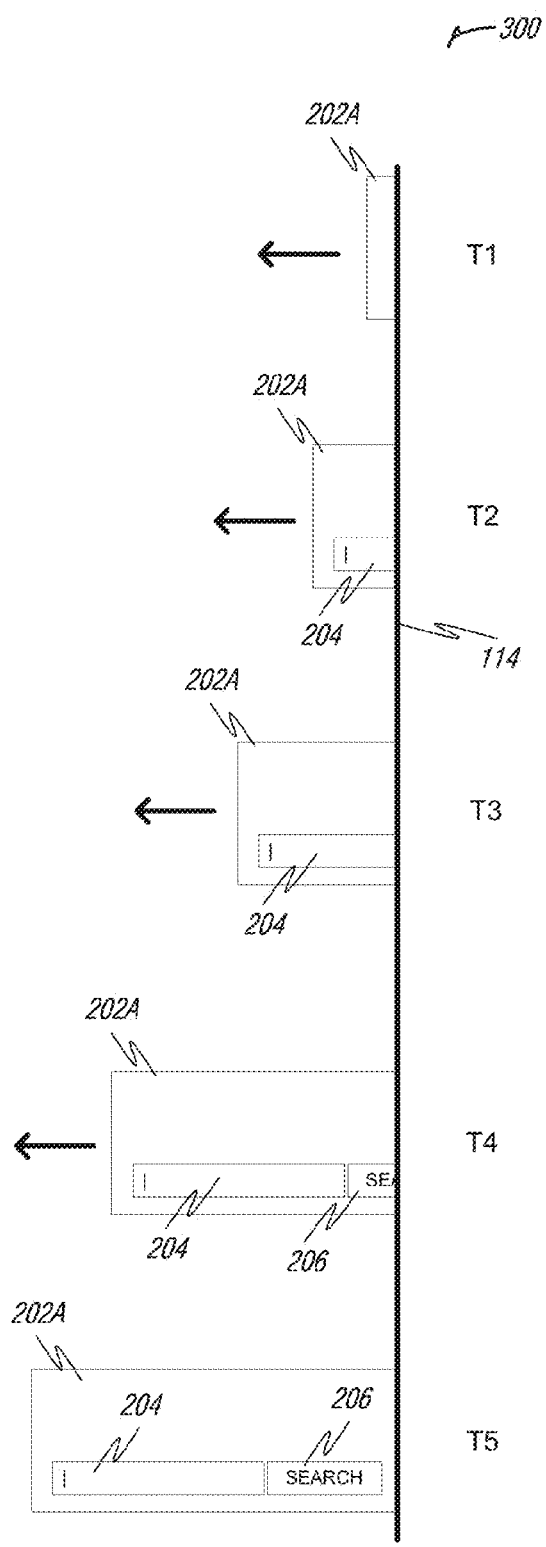
FIG. 3 is a timeline diagram illustrating the presenting of a slider search control by automatically sliding the slider search control into the content display area of an Internet browsing application, in accordance with various embodiments.

FIG. 3 is a timeline diagram 300 illustrating an example of presenting slider search control 202A by automatically sliding the slider search control 202A into the content display area 106 of an Internet browsing application 100 from right edge 114, in accordance with various embodiments.

At time T1, slider search control 202A begins to slide leftwards into content display area 106 from right edge 114.

At time T2, part of text box 204 becomes visible as slider search control 202A continues to slide leftwards into content display area 106 from right edge 114.

At time T3, more of text box 204 becomes visible as slider search control 202A continues to slide leftwards into content display area 106 from right edge 114.

At time T4, text box 204 is completely visible and part of search button 206 becomes visible as slider search control 202A continues to slide leftwards into content display area 106 from right edge 114.

At time T5, slider search control 202A has completed its slide leftwards into content display area 106 from right edge 114, and both text box 204 and search button 206 are completely visible.

Although this example showed slider search control 202A sliding leftwards from the right edge 114, other motions are possible, such as sliding rightwards from left edge 112, sliding up from bottom edge 116, sliding downwards from top edge 118, and combinations thereof. Furthermore, although this example used slider search control 202A, the sliding functionality of slider search control 202A is applicable to slider search controls 202B and 202C (see FIGS. 6 and 7 and related paragraphs, respectively).

Figure 4:
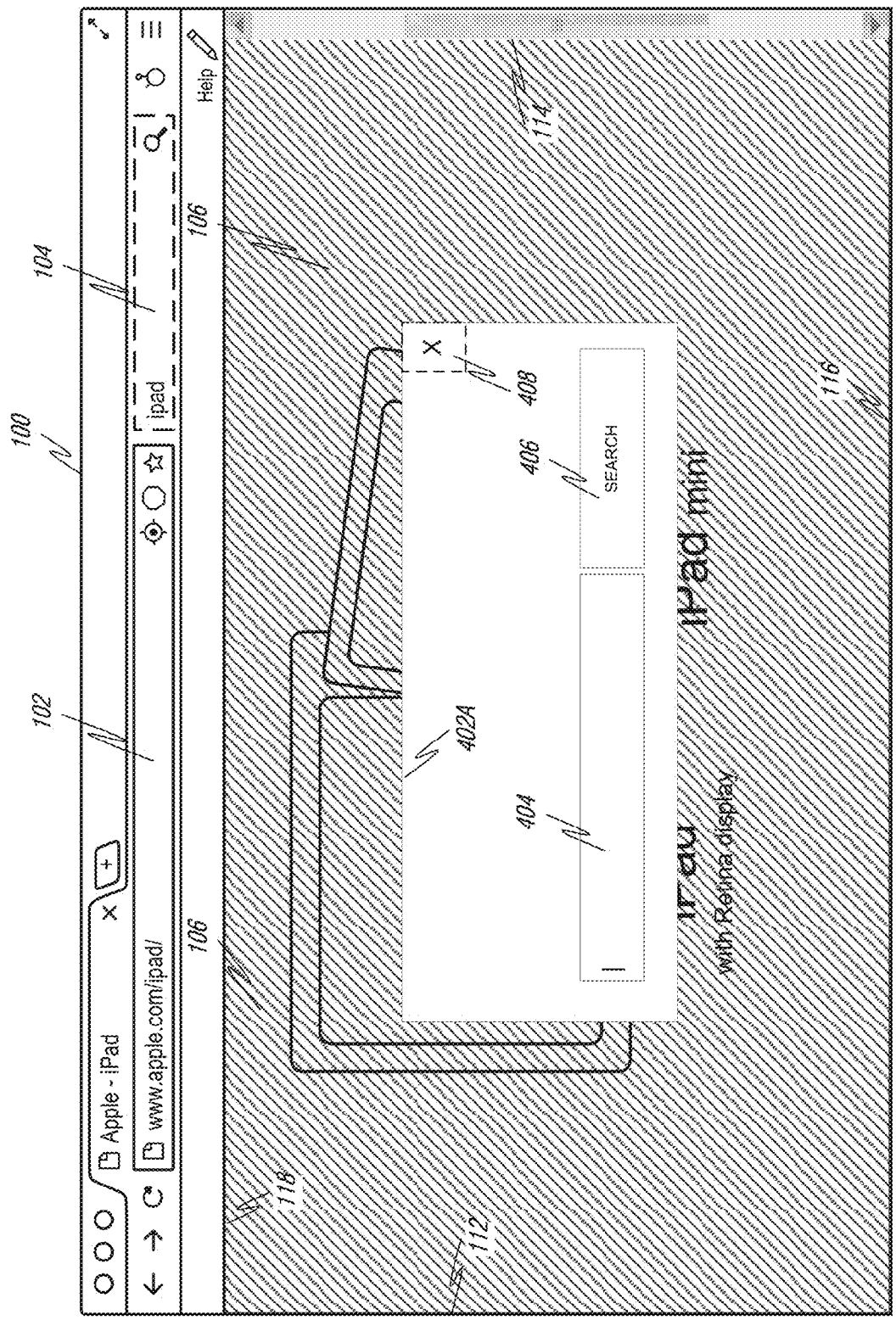
FIG. 4 is a view of an Internet browsing application with a lightbox search control displayed, in accordance with various embodiments.

FIG. 4 is a view of an Internet browsing application 100 with a lightbox search control 402A displayed, in accordance with various embodiments. In various embodiments, the lightbox search control 402A includes a text box 404 and a search button 406. In various embodiments, the lightbox search control 402A may optionally include a close button 408. In various embodiments, the lightbox search control 402A visually covers at least a portion of content display area 106.

In various embodiments, the presentation of the lightbox search control 402A includes drawing user attention to the lightbox search control 402A and away from the content display area 106 outside of the lightbox search control 402A. This may be done by shading, darkening, dimming, blurring, opaquing, or otherwise diminishing the visual impact of the content display area 106 outside of the lightbox search control 402A.

In various embodiments, the lightbox search control 402A is presented to the user in response to a period of user inactivity. In various embodiments, a period of user inactivity can be a predetermined amount of time, during which the user does not scroll, input, select, or otherwise interact with the web page.

In FIG. 4, the lightbox search control 402A is displayed at the center of content display area 106. However, in various embodiments, the lightbox search control 402A may be displayed in a number of different ways. For example, the lightbox search control 402A may be displayed as anchored to at least one of the left edge 112, the right edge 114, the bottom edge 116, and the top edge 118 of content display area 106.

In various embodiments, lightbox search control 402A may be displayed in the content display area 106 of the currently displayed tab of Internet browsing application 100.

In various embodiments, the lightbox search control 402A may be displayed in the content display area 106 of each open tab of Internet browsing application 100.

In various embodiments, the lightbox search control 402A remains visible after being presented. In various embodiments, the lightbox search control 402A remains visible until the user closes the lightbox search control 402A, such as by selecting the close button 408 displayed in lightbox search control 402A or by selecting the "ESC" key on a keyboard of the computer.

In various embodiments, upon the lightbox search control 402A being presented, text box 404 may have "focus." By having "focus," the text box 404 is ready to receive textual input without the user having to select text box 404 prior to the textual input.

In various embodiments, the text box 404 can receive textual input corresponding to a search query to be communicated to a search engine. For example, the user could enter a search query, such as "Chinese takeout," into text box 404 and direct the search query to be communicated to one or more search engines by either hitting the "Enter" key or by selecting the search button 406.

In various embodiments, text box 404 of lightbox search control 402A may be prepopulated with one or more search terms; each search term may correspond to a search term used in a previous search or to content in the content display area 106 of the Internet browsing application 100.

In various embodiments, after receiving the search query from text box 404, a tracking code is combined with the search query to form a search request. In various embodiments, the tracking code is associated with at least one of a user, the Internet browsing application 100, a session of the Internet browsing application 100, the computer upon which the Internet browsing application 100 is executing, an entity such as a company or non-profit organization, for whom search loyalty rewards will accumulate, or another process, device, person, or entity having an account. Such tracking codes, and other tracking codes, may also be associated with a provider of the lightbox search control 402A as disclosed herein. A tracking code associated with the provider of the lightbox search control 402A may be used to track one or more of searches performed, links selected, and revenue accumulated resulting from lightbox search control 402A usage. For example, a tracking code combined with a search query for submission to a particular search engine will be used by the search engine to credit an account as compensation for routing the search to that search engine.

In various embodiments, the search request is communicated to at least one search engine. In various embodiments, search requests are submitted only to those search engines with which the software publisher of the lightbox search control 402A has an agreement.

In various embodiments, the text box 404 suggests search terms using "autocomplete" or "word completion".

Figure 5:
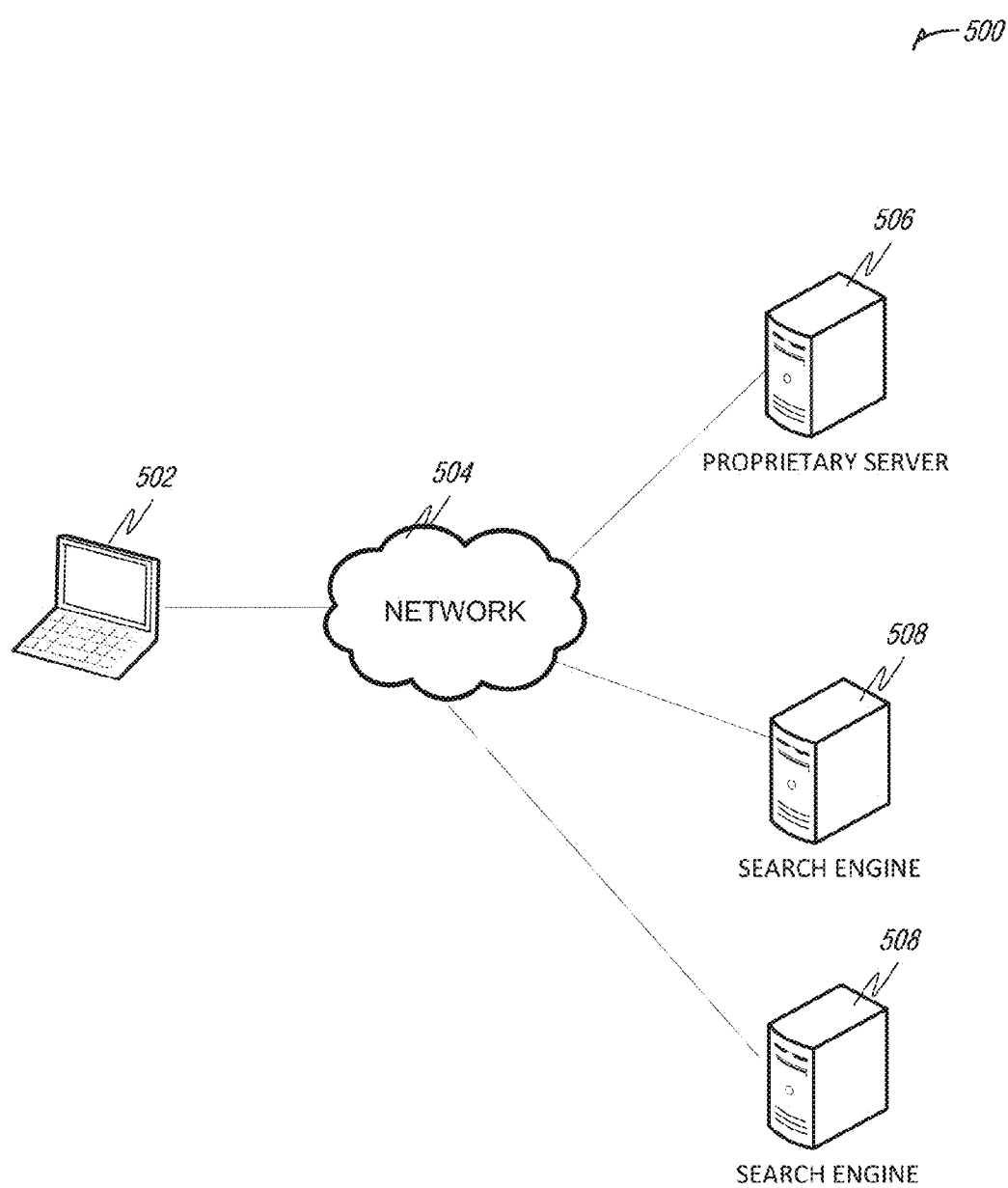
FIG. 5 is a system diagram illustrating an implementation of a system supporting search controls that use a slider or a lightbox, in accordance with various embodiments.

FIG. 5 is a system diagram illustrating an implementation of a system 500 supporting slider and lightbox search controls, in accordance with various embodiments. In various embodiments, a system 500 supporting slider and lightbox search controls includes a computing device 502, a network 504, a proprietary server 506, and one or more search engines 508. In various embodiments, proprietary server 506 is controlled by the publisher of the slider search control and lightbox search control. In various embodiments, network 504 may be a public or private network, a combination of networks, or the Internet. Although proprietary server 506 is illustrated in FIG. 5 as a single machine, in various embodiments that include proprietary server 506 interconnected via a network 504, the proprietary server 506 may comprise multiple servers working together as a colocated, distributed, or cloud-based system.

In various embodiments, a computing device 502 executes an Internet browsing application 100. In various embodiments, a stand-alone executable injects JavaScript into each page loaded by the Internet browsing application 100. An add-on, also known as a plug-in or an extension, is software that enhances an Internet browsing application 100 and usually cannot execute independently from Internet browsing application 100. In various embodiments, an add-on to the Internet browsing application 100 injects code, such as JavaScript, into each page loaded by the Internet browsing application 100.

In various embodiments, search requests submitted by Internet browsing application 100 executing on computing device 502 are communicated to at least one search engine 508 via network 504. In various embodiments, search requests are submitted only to those search engines 508 with which the software publisher of the slider search control and/or lightbox search control has an agreement.

To facilitate updates to the slider and lightbox search controls, a small snippet of JavaScript code is injected into each page loaded by the Internet browsing application 100. Upon being executed, the JavaScript code causes the Internet browsing application 100 to send, via network 504, version information of the current slider and/or lightbox search control used in the Internet browsing application 100 to a proprietary server 506 specified in the JavaScript snippet. If the proprietary server 506 determines that the Internet browsing application 100 is using a version of the slider and/or lightbox search control that is out-of-date, the proprietary server 506 will return to the Internet browsing application 100 a JavaScript file containing updated JavaScript code for a new version of the slider and/or lightbox search controls. The updated JavaScript code for the new version of the slider and/or lightbox search controls is then injected into each page loaded by the Internet browsing application 100. Embodiments of this technique allow the JavaScript code for the slider and/or lightbox search controls to be updated as necessary.

Figure 6:
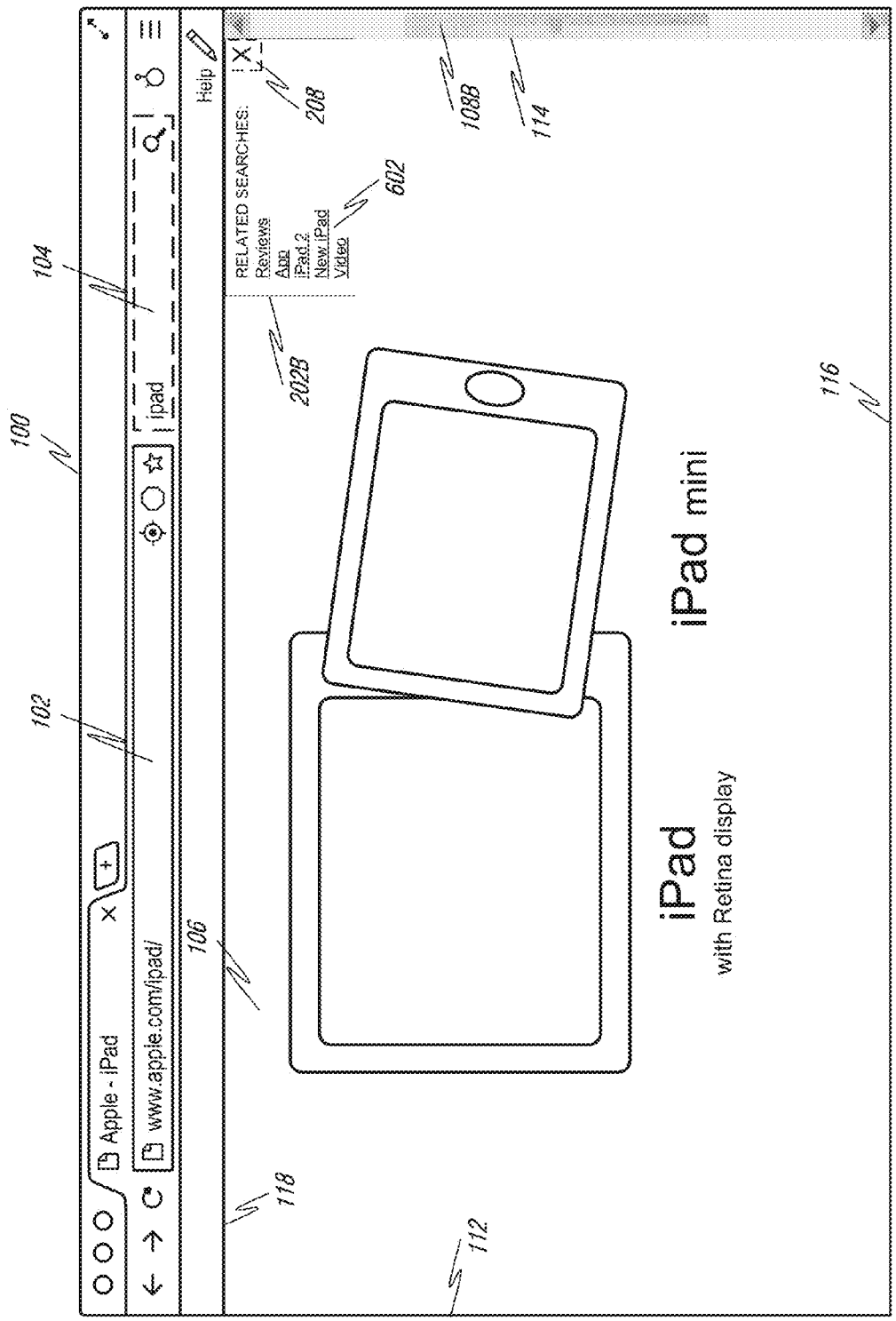
FIG. 6 is another example of an Internet browsing application with a slider search control displayed, in accordance with various embodiments.

FIG. 6 is another example of an Internet browsing application 100 with slider search control 202B displayed, in accordance with various embodiments. In various embodiments, slider search control 202B may optionally include close button 208. Instead of text box 204 and search box 206, slider search control 202B includes a set of search queries 602. Each search query in the set of search queries 602 includes at least one search term, and each search term may correspond to a search term used in a previous search or to content in the content display area 106 of the Internet browsing application 100. For example, in FIG. 6, the set of search queries 602 includes the search queries "Reviews," "App," "iPad 2," "New iPad," and "Video". Each search query in the set of search queries 602 is presented as a hyperlink. When a search query hyperlink is selected, a search request associated with the search query is communicated to a search engine. The search request includes a tracking code in much the same manner as tracking codes are used in slider search control 202A.

Capturing Search Terms

In various embodiments, search keywords submitted outside of the slider search control 202B may be captured by the slider search control 202B as follows. In various embodiments, upon the loading of each web page, the JavaScript code for the slider and/or lightbox search control checks the URL of the web page to determine whether the web page belongs to a search engine website. In various embodiments, the URL of the current web page is determined by inspecting the 'window.location' object that is common to all major Internet browsing applications 100. The value of the 'window.location' object may then be compared to a 'search engine list' that contains the search engines, from which the JavaScript code for the slider and/or lightbox search control can capture search terms.

In various embodiments, for each search engine, the 'search engine list' contains a URL parameter that is used by that search engine to store a user's search query when the user's Internet browsing application 100 submits a search request to that search engine. The JavaScript code for the slider and/or lightbox search controls can use this parameter to parse the URL that is generated from a search request to determine the search query for that search request.

As an example, user A goes to yahoo.com to perform a search for 'iPhone case'. When user A submits the search query 'iPhone case' to the Yahoo! search engine, the Internet browsing application 100 submits a search request in the form of an HTTP GET request to the Yahoo! search engine. The Yahoo! search engine redirects Internet browsing application 100 to a web page containing search results for 'iPhone case'. The URL for the search results web page, such as "http://search.yahoo.com/search;_ylt= Av16e_yKwMnNvBcaijYVkmbvZx4?p=iphone+ case&toggle=1&cop=mss&ei=UTF-8&fr=yfp-t-901" contains various parameters. The search query 'iPhone case' is stored as 'iphone+case' in the 'p' parameter. The JavaScript code for the slider and/or lightbox search controls detects when user A is on the yahoo.com by inspecting the 'window.location' object and captures the value of the 'p' parameter.

Major search engines rarely change the parameters used in HTTP GET request URLs, which makes this a reliable way of capturing a user's search query. If a search engine were to change the parameter used to store search queries, the 'search engine list' contained in the remote JavaScript file could be updated accordingly, and the user's Internet browsing application 100 would receive the updated JavaScript code the next time a check is made for an updated version of the JavaScript code (see FIG. 5 and related paragraphs).

In various embodiments, search queries could be captured by using JavaScript selectors to find the search input element of the web page containing the search engine's results. Generally, a search results page contains only one input element. However, the HTML structure of a search results page could change more often than the GET request parameter.

Storing Search Terms

After capturing the user's search query, the search query may be stored so that it may be used by the slider and/or lightbox search controls.

Storing Search Terms Using Web Storage

In various embodiments, a search query may be stored in the web storage of the user's Internet browsing application 100. In HTML 5, web pages can store data on an Internet browsing application 100 using either the 'localStorage' object or the 'sessionStorage' object. Data stored in the 'localStorage' object does not expire, whereas data stored in the 'sessionStorage' object expires at the end of the session of the Internet browsing application 100. Data stored in the 'localStorage' or 'sessionStorage' objects is stored as key/value pairs.

Data stored in the 'localStorage' object or the 'sessionStorage' object can only be accessed by the same origin, i.e., the same web site. To enable access to the web storage objects from other origins, a common pattern known as "Cross-Origin Messaging" may be used. The JavaScript code may insert a hidden iframe element into each web page. The source attribute, known as 'src', may be set to the domain of the remote server housing the JavaScript file for the slider and/or lightbox search controls. The iframe element contains JavaScript code that listens for messages from the parent window object of the Internet browsing application 100. The JavaScript file (on the remote server) uses an HTML method called 'postMessage' to send a message to the iframe JavaScript code to get, set, or remove a value from the web storage in the iframe.

Storing Search Terms Using Cookies

In various embodiments, the JavaScript code stores search queries using cookies. The cookies can be either session cookies or persistent cookies. Using web storage, rather than cookies, is preferable because (1) the data is not sent with each request, (2) cookies set by an iframe may be considered third-party cookies, which may be blocked by the user's Internet browsing application 100, and (3) much more data may be stored in web storage than in cookies.

Storing Search Terms Using Server-Side Storage

A number of methods exist for storing search queries on a server rather than on the user's computer. In various embodiments, the inserted iframe element may make an XHR request to the server, which may then store the data.

In various embodiments, a script element is inserted into the JavaScript code. The script element has the 'src' attribute set to the URL of the server. When executed, this script element will make an HTTP GET request to the server and pass any parameters set in the 'src' URL to the server, allowing the server to read and store these parameters for later use.

Either method of server-side storage may require an identifier to be passed along with each request, so that the server knows which user is submitting the request. Two common methods for storing such identifiers are cookies and web storage.

Figure 7:
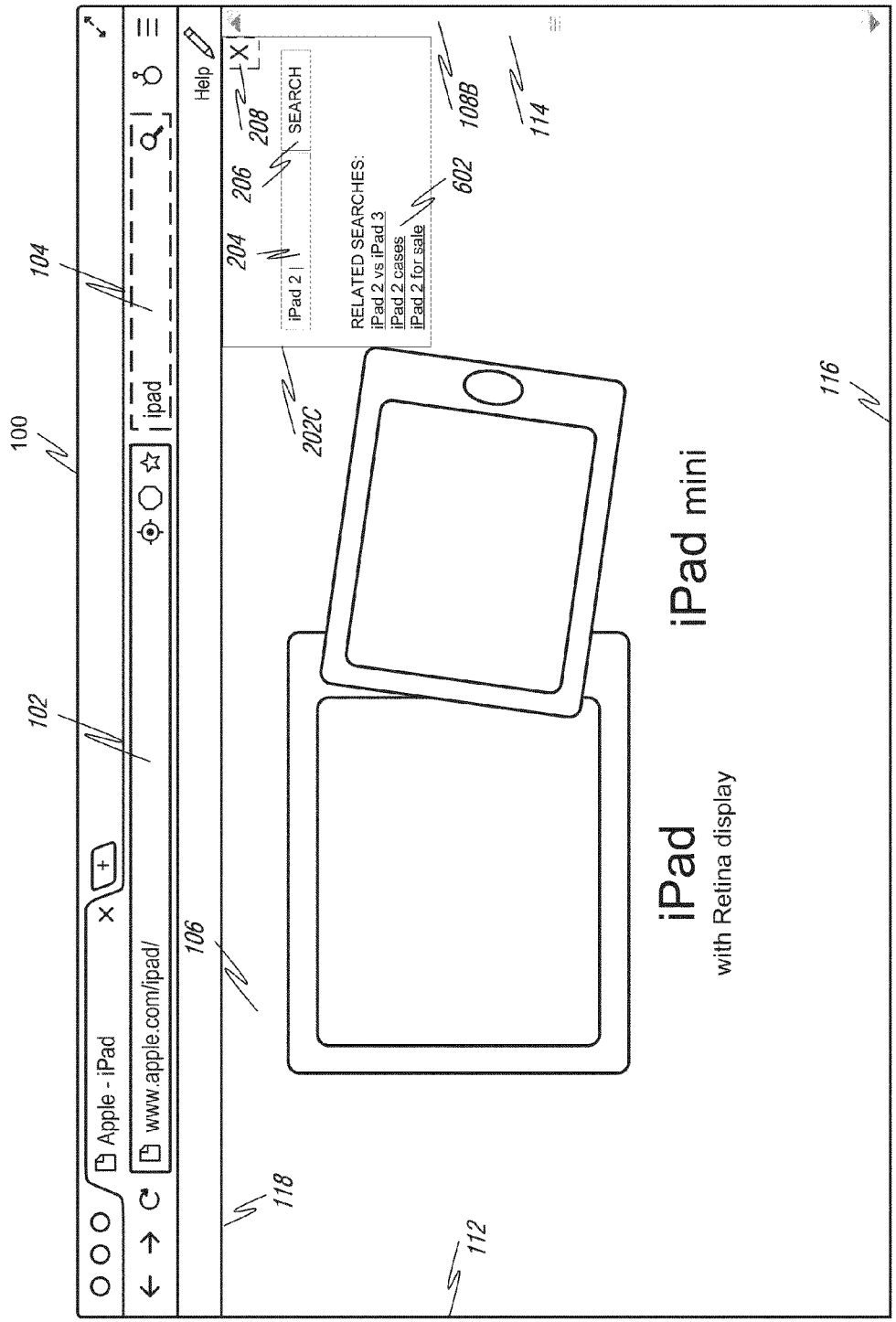
FIG. 7 is another example of an Internet browsing application with a slider search control displayed, in accordance with various embodiments.

FIG. 7 is another example of an Internet browsing application 100 with a slider search control 202C displayed, in accordance with various embodiments. In various embodiments, slider search control 202C may optionally include close button 208. In addition to text box 204 and search box 206, slider search control 202C includes a set of search queries 602. Thus, the appearance and functionality of slider search control 202C may be considered a combination of those of slider search controls 202A and 202B.

Figure 8:
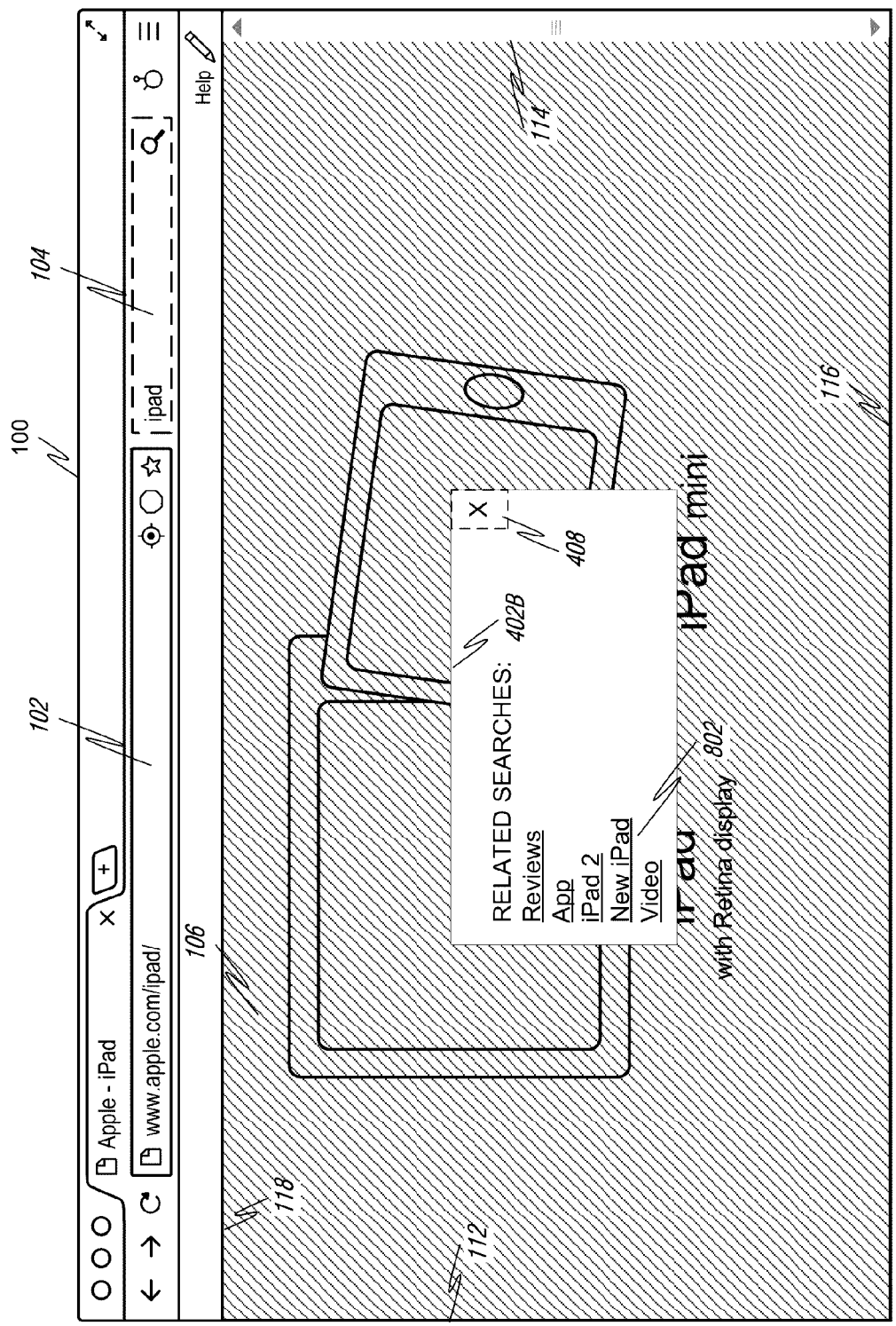
FIG. 8 is another example of an Internet browsing application with a lightbox search control displayed, in accordance with various embodiments.

FIG. 8 is another example of an Internet browsing application 100 with a lightbox search control 402B displayed, in accordance with various embodiments. In various embodiments, lightbox search control 402B may optionally include close button 408. Instead of text box 404 and search box 406, lightbox search control 402B includes a set of search queries 802, similar in appearance and functionality to the set of search queries 602 of slider search control 202B, and lightbox search control 402B may capture and store search terms in much the same ways as slider search control 202B (see FIG. 6 and related paragraphs).

Figure 9:
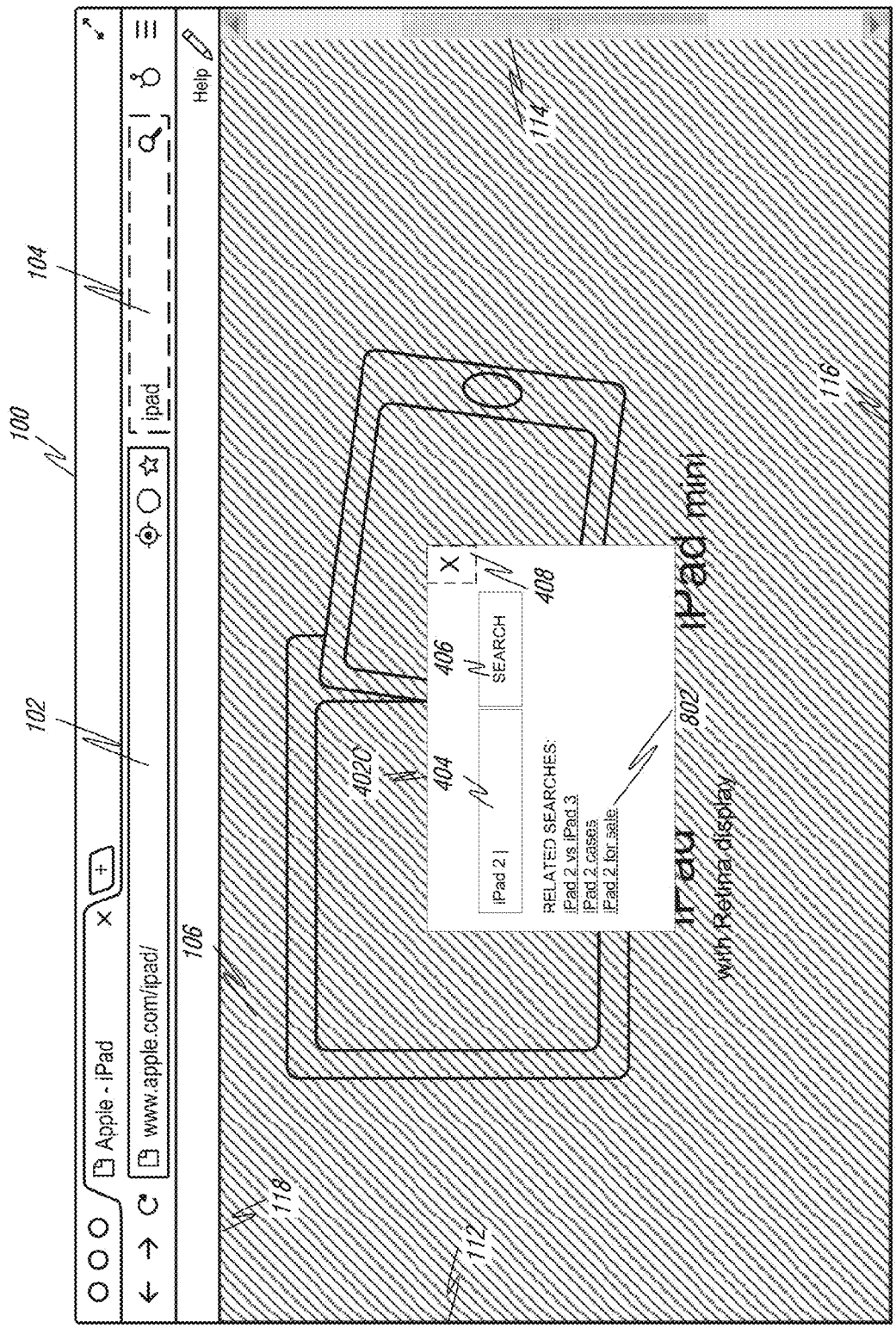
FIG. 9 is another example of an Internet browsing application with a lightbox search control displayed, in accordance with various embodiments.

FIG. 9 is another example of an Internet browsing application 100 with a lightbox search control 402C displayed, in accordance with various embodiments. In various embodiments, lightbox search control 402C may optionally include close button 408. In addition to text box 404 and search box 406, lightbox search control 402C includes a set of search queries 802. Thus, the appearance and functionality of lightbox search control 402C may be considered a combination of those of lightbox search controls 402A and 402B.

Figure 10:
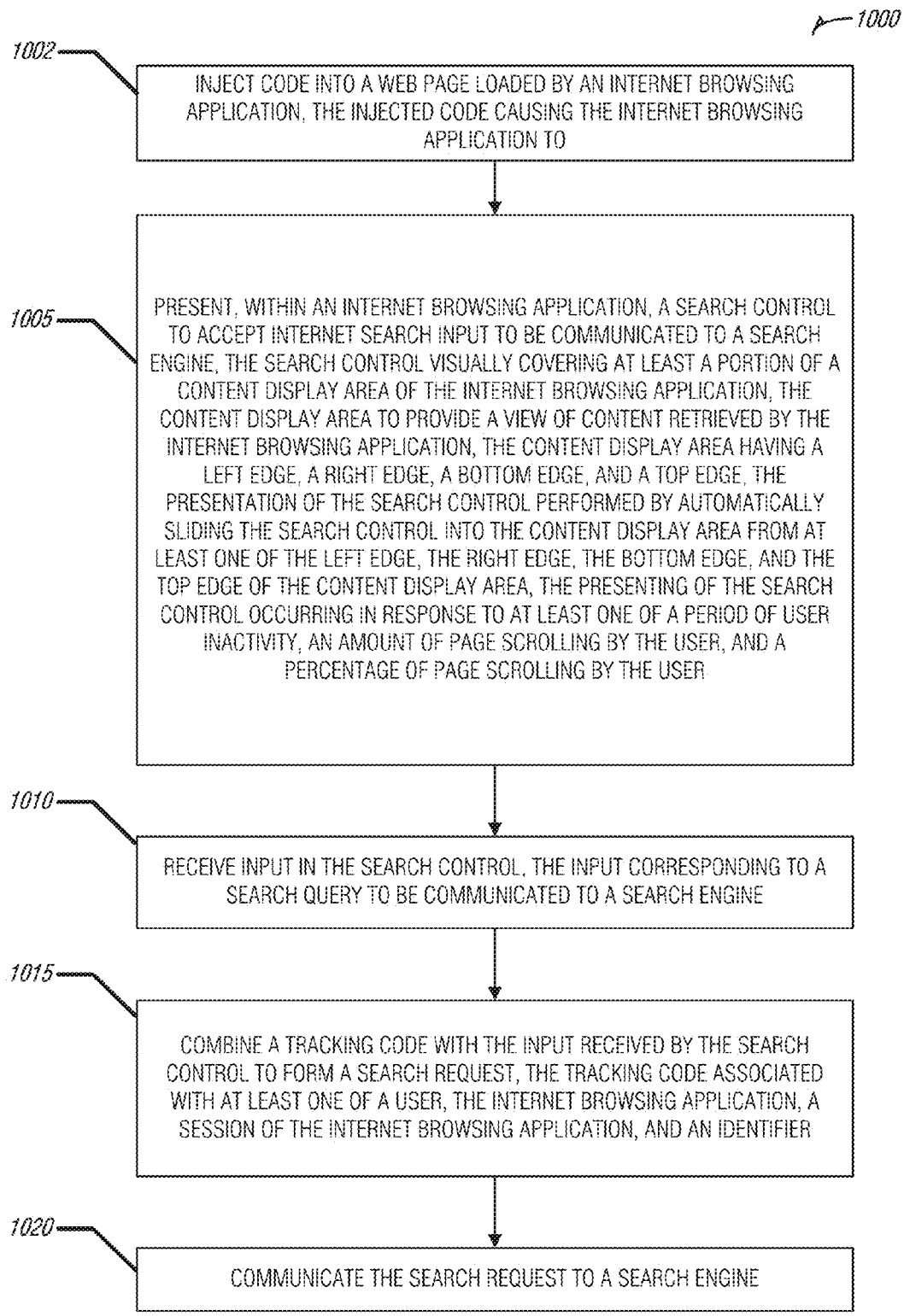
FIG. 10 is a flowchart illustrating a method for utilizing a slider search control to perform Internet searches, in accordance with various embodiments.

FIG. 10 is a flowchart illustrating a method 1000 for utilizing a slider search control to perform Internet searches, in accordance with various embodiments.

At 1002, code is injected into a web page loaded by an Internet browsing application.

At 1005, a search control is presented within an Internet browsing application, the search control to accept Internet search input to be communicated to a search engine, the search control visually covering at least a portion of a view of a content display area of the Internet browsing application, the content display area to provide a view of content retrieved by the Internet browsing application, the content display area having a left edge, a right edge, a bottom edge, and a top edge, the presenting of the search control performed by automatically sliding the search control into the content display area from at least one of the left edge, the right edge, the bottom edge, and the top edge of the content display area, the presenting of the search control occurring in response to at least one of a period of user inactivity, an amount of page scrolling by the user, and a percentage of page scrolling by the user.

At 1010, input in the search control is received, the input corresponding to a search query to be transmitted communicated to a search engine.

At 1015, a tracking code is combined with the input received by the search control to form a search request, the tracking code associated with at least one of a user, the Internet browsing application, a session of the Internet browsing application, and an identifier, such as a company ID.

At 1020, the search request is communicated to a search engine.

In various embodiments, the method 1000 is implemented by an Internet browser add-on. In various embodiments, the Internet browser add-on is bundled with other software for distribution.

Figure 11:
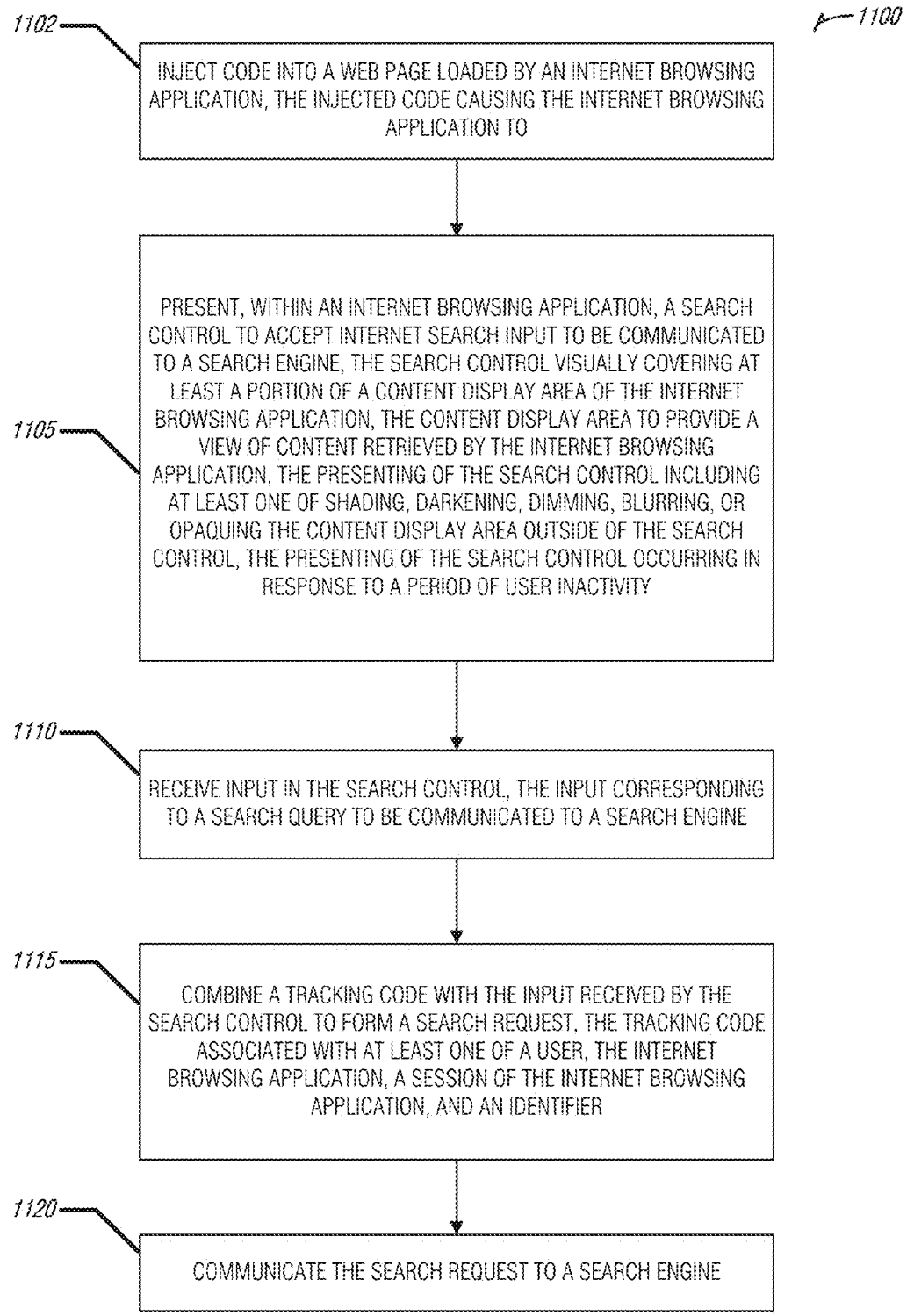
FIG. 11 is a flowchart illustrating a method for utilizing a lightbox search control to perform Internet searches, in accordance with various embodiments.

FIG. 11 is a flowchart illustrating a method 1100 for utilizing a lightbox search control to perform Internet searches, in accordance with various embodiments.

At 1102, code is injected into a web page loaded by an Internet browsing application.

At 1105, a search control is presented within an Internet browsing application, the search control to accept Internet search input to be communicated to a search engine, the search control visually covering at least a portion of a content display area of the Internet browsing application, the content display area to provide a view of content retrieved by the Internet browsing application, the presenting of the search control including at least one of darkening and opaquing the content display area outside of the search control, the presenting of the search control occurring in response to a period of user inactivity.

At 1110, input in the search control is received, the input corresponding to a search query to be communicated to a search engine.

At 1115, a tracking code is combined with the input received by the search control to form a search request, the tracking code associated with at least one of a user, the Internet browsing application, a session of the Internet browsing application, and an identifier, such as a company ID.

At 1120, the search request is communicated to a search engine.

In various embodiments, the method 1100 is implemented by an Internet browser add-on. In various embodiments, the Internet browser add-on is bundled with other software for distribution.

Figure 12:
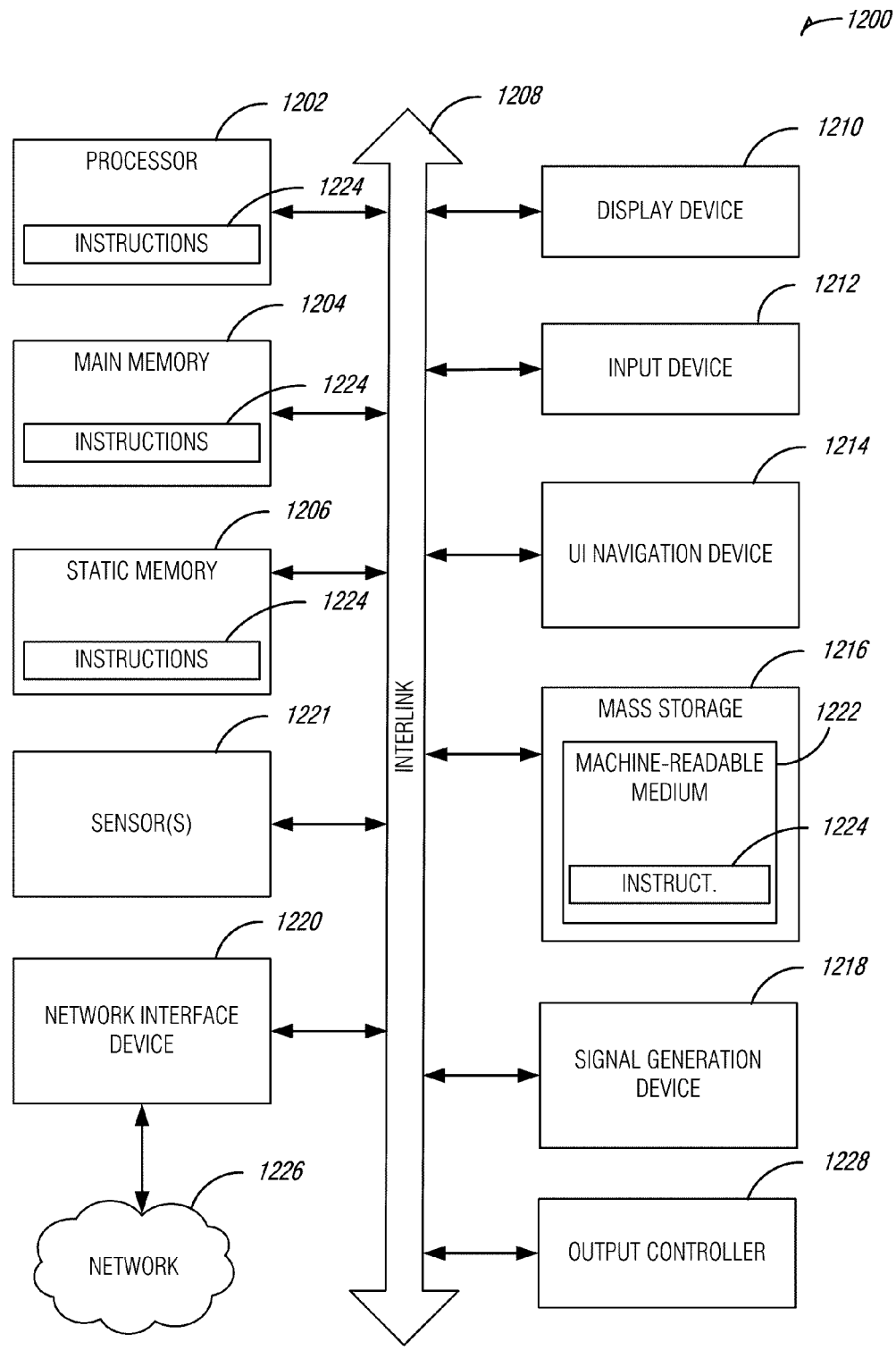
FIG. 12 is a block diagram illustrating a machine in the example form of a computer system, within which a set or sequence of instructions for causing the machine to perform any one of the methodologies discussed herein may be executed, in accordance with various embodiments.

FIG. 12 illustrates a block diagram of an example machine 1200 upon which any one or more of the techniques (e.g., methodologies) discussed herein may be executed, in accordance with various embodiments. In alternative embodiments, the machine 1200 may operate as a standalone device or may be connected (e.g., networked) to other machines. In a networked deployment, the machine 1200 may operate in the capacity of a server machine, a client machine, or both in server-client network environments. In an example, the machine 1200 may act as a peer machine in peer-to-peer (P2P) (or other distributed) network environment. The machine 1200 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1200 may include a hardware processor 1202 (e.g., a central processing unit (CPU), a graphics processing unit (GPU), a hardware processor core, or any combination thereof), a main memory 1204 and a static memory 1206, some or all of which may communicate with each other via an interlink (e.g., bus) 1208. The machine 1200 may further include a display unit 1210, an alphanumeric input device 1212 (e.g., a keyboard), and a user interface (UI) navigation device 1214 (e.g., a mouse). In an example, the display unit 1210, input device 1212 and UI navigation device 1214 may be a touch screen display. The machine 1200 may additionally include a storage device (e.g., drive unit) 1216, a signal generation device 1218 (e.g., a speaker), a network interface device 1220, and one or more sensors 1221, such as a global positioning system (GPS) sensor, compass, accelerometer, or other sensor. The machine 1200 may include an output controller 1228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1216 may include a machine-readable medium 1222 on which is stored one or more sets of data structures or instructions 1224 (e.g., software) embodying or utilized by any one or more of the techniques or functions described herein. The instructions 1224 may also reside, completely or at least partially, within the main memory 1204, within static memory 1206, or within the hardware processor 1202 during execution thereof by the machine 1200. In an example, one or any combination of the hardware processor 1202, the main memory 1204, the static memory 1206, or the storage device 1216 may constitute machine-readable media.

Although the machine readable medium 1222 is illustrated as a single medium, the term "machine readable medium" may include a single medium or multiple media (e.g., a centralized or distributed database, and/or associated caches and servers) configured to store the one or more instructions 1224.

The term "machine-readable medium" may include any medium that is capable of storing, encoding, or carrying instructions for execution by the machine 1200 and that cause the machine 1200 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having resting mass. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1224 may further be transmitted or received over a communications network 1226 using a transmission medium via the network interface device 1220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1220 may include one or more physical jacks (e.g., Ethernet, coaxial, or phone jacks) or one or more antennas to connect to the communications network 1226. In an example, the network interface device 1220 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1200, and includes digital or analog communications signals or other intangible medium to facilitate communication of such software.

Additional Notes & Examples

The following examples pertain to further embodiments.

Example 1 may include subject matter (such as a method, means for performing acts, or computer-readable storage including instructions that, when performed by a computer cause the computer to performs acts) comprising: injecting code into each web page loaded by an Internet browsing application, the injected code causing the Internet browsing application to: present a search control to accept Internet search input to be communicated to a search engine, the search control visually covering at least a portion of a content display area of the Internet browsing application, the content display area to provide a view of content retrieved by the Internet browsing application, the presenting of the search control including at least one of shading, darkening, dimming, blurring, or opaquing the content display area outside of the search control, the presenting of the search control occurring in response to a period of user inactivity; receiving input in the search control, the input corresponding to a search query to be communicated to a search engine; combining a tracking code with the input received by the search control to form a search request, the tracking code associated with at least one of a user, the Internet browsing application, a session of the Internet browsing application, and an identifier; and communicating the search request to a search engine.

In Example 2, the subject matter of Example 1 may include, wherein the search control includes a text box pre-populated with a search term corresponding to at least one of a previous search and content in the content display area of the Internet browsing application.

In Example 3, the subject matter of any of Examples 1-2 may include, wherein the text box suggests search terms using autocomplete.

In Example 4, the subject matter of any of Examples 1-3 may include, wherein the search control includes a set of search queries, each search query comprising at least one search term, each search term corresponding to at least one of a previous search and content in the content display area of the Internet browsing application, each search query presented as a hyperlink, which, upon being selected, causes a search request associated with the search query to be communicated to a search engine.

In Example 5, the subject matter of any of Examples 1-4 may include, capturing search terms communicated as part of a search query to a search engine, the input of the search terms occurring outside of the search control.

In Example 6, the subject matter of any of Examples 1-5 may include, wherein the injected code is injected by at least one of an add-on to the Internet browsing application and a stand-alone application.

Example 7 includes an Internet browser add-on implementing the subject matter of any of Examples 1-6.

Example 8 includes the Internet browser add-on of Example 7, wherein the Internet browser add-on is bundled with other software for distribution.

Example 9, may include, or may optionally be combined with the subject matter of any one of Examples 1-8 to include, subject matter (such as a device, apparatus, or a system) comprising: a processor, a memory device, and a network interface device operatively coupled via a bus; instructions stored in the memory device and executable on the processor to: inject code into each web page loaded by an Internet browsing application, the injected code causing the Internet browsing application to: present a search control to accept Internet search input to be communicated to a search engine, the search control visually covering at least a portion of a content display area of the Internet browsing application, the content display area to provide a view of content retrieved by the Internet browsing application, the presenting of the search control including at least one of shading, darkening, dimming, blurring, or opaquing the content display area outside of the search control, the presenting of the search control occurring in response to a period of user inactivity; receive input in the search control, the input corresponding to a search query to be transmitted to a search engine; combine a tracking code with the input received by the search control to form a search request, the tracking code associated with at least one of a user, the Internet browsing application, a session of the Internet browsing application, and an identifier; and transmit, via a network interface device, the search request to a search engine.

In Example 10, the subject matter of Example 9 may include, wherein the search control includes a text box pre-populated with a search term corresponding to at least one of a previous search and content in the content display area of the Internet browsing application.

In Example 11, the subject matter of any of Examples 9-10 may include, wherein the text box suggests search terms using autocomplete.

In Example 12, the subject matter of any of Examples 9-11 may include, wherein the search control includes a set of search queries, each search query comprising at least one search term, each search term corresponding to at least one of a previous search and content in the content display area of the Internet browsing application, each search query presented as a hyperlink, which, upon being selected, causes a search request associated with the search query to be transmitted to a search engine.

In Example 13, the subject matter of any of Examples 9-12 may include further instructions that are executable by the processor to cause the injected code to: capture search terms transmitted as part of a search query to a search engine, the input of the search terms occurring outside of the search control.

In Example 14, the subject matter of any of Examples 9-13 may include, wherein the injected code is injected by at least one of an add-on to the Internet browsing application and a stand-alone application.

The above detailed description includes references to the accompanying drawings, which form a part of the detailed description. The drawings show, by way of illustration, specific embodiments that may be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc., are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A non-transitory machine-readable storage medium, with instructions stored thereon, which when executed by at least one processor of a computing device, cause the computing device to perform operations comprising:
   causing an Internet browsing application to load web page code which, when executed by the Internet browsing application, causes the Internet browsing application to:
     present a search control to accept Internet search input to be communicated to at least one search engine capable of receiving a search request and outputting search results, the search control visually covering at least a portion of a content display area of the Internet browsing application, the content display area being of a first size and the portion being of a second size smaller than the first size, the content display area to provide a view of content retrieved by the Internet browsing application, the presenting of the search control including at least one of shading, darkening, dimming, blurring, or opaquing the content display area outside of the search control, the presenting of the search control occurring in response to a period of user inactivity;
     receive input in the search control, the input corresponding to the search request to be communicated to the at least one search engine; and
     communicate the search request to the at least one search engine.

2. The non-transitory machine-readable storage medium of claim 1, wherein the search control includes a text box pre-populated with a search term corresponding to at least one of a previous search and content in the content display area of the Internet browsing application.

3. The non-transitory machine-readable storage medium of claim 2, wherein the text box suggests search terms using autocomplete.

4. The non-transitory machine-readable storage medium of claim 1, wherein the search control includes a set of search queries, each search query comprising at least one search term, each search term corresponding to at least one of a previous search and content in the content display area of the Internet browsing application, each search query presented as a hyperlink, which, upon being selected, causes a search request associated with the search query to be communicated to the at least one search engine.

5. The non-transitory machine-readable storage medium of claim 1, wherein the web page code, when executed by the Internet browsing application, further causes the Internet browsing application to:
   capture search terms communicated as part of a search query to a search engine, the input of the search terms occurring outside of the search control.

6. A method performed by a computing device, the method comprising:
   executing an Internet browsing application to load web page code which, when executed by the Internet browsing application, causes the Internet browsing application to:
     present a search control to accept Internet search input to be communicated to at least one search engine capable of receiving a search request and outputting search results, the search control visually covering at least a portion of a content display area of the Internet browsing application, the content display area being of a first size and the portion being of a second size smaller than the first size, the content display area to provide a view of content retrieved by the Internet browsing application, the presenting of the search control including at least one of shading, darkening, dimming, blurring, or opaquing the content display area outside of the search control, the presenting of the search control occurring in response to a period of user inactivity;
     receive input in the search control, the input corresponding to the search request to be communicated to the at least one search engine; and
     communicate the search request to the at least one search engine.

7. The method of claim 6, wherein the search control includes a text box pre-populated with a search term corresponding to at least one of a previous search and content in the content display area of the Internet browsing application.

8. The method of claim 7, wherein the text box suggests search terms using autocomplete.

9. The method of claim 6, wherein the search control includes a set of search queries, each search query comprising at least one search term, each search term corresponding to at least one of a previous search and content in the content display area of the Internet browsing application, each search query presented as a hyperlink, which, upon being selected, causes a search request associated with the search query to be communicated to the at least one search engine.

10. The method of claim 6, wherein the web page code, when executed by the Internet browsing application, further causes the Internet browsing application to:
    capture search terms communicated as part of a search query to a search engine, the input of the search terms occurring outside of the search control.

11. A system, comprising:
    a processor, a memory device, and a network interface device operatively coupled via a bus; and
    instructions stored in the memory device and executable by the processor to:
        execute an Internet browsing application to load web page code which, when executed by the Internet browsing application, causes the Internet browsing application to:
            present a search control to accept Internet search input to be communicated to at least one search engine capable of receiving a search request and outputting search results, the search control visually covering at least a portion of a content display area of the Internet browsing application, the content display area being of a first size and the portion being of a second size smaller than the first size, the content display area to provide a view of content retrieved by the Internet browsing application, the presenting of the search control including at least one of shading, darkening, dimming, blurring, or opaquing the content display area outside of the search control, the presenting of the search control occurring in response to a period of user inactivity;
            receive input in the search control, the input corresponding to the search request to be transmitted to the at least one search engine; and
            transmit, via the network interface device, the search request to the at least one search engine.

12. The system of claim 11, wherein the search control includes a text box pre-populated with a search term corresponding to at least one of a previous search and content in the content display area of the Internet browsing application.

13. The system of claim 12, wherein the text box suggests search terms using autocomplete.

14. The system of claim 11, wherein the search control includes a set of search queries, each search query comprising at least one search term, each search term corresponding to at least one of a previous search and content in the content display area of the Internet browsing application, each search query presented as a hyperlink, which, upon being selected, causes a search request associated with the search query to be transmitted to the at least one search engine.

15. The system of claim 11, wherein the web page code, when executed by the Internet browsing application, further causes the Internet browsing application to:
    capture search terms transmitted as part of a search query to a search engine, the input of the search terms occurring outside of the search control.

\* \* \* \* \*